(12) United States Patent
Milhau et al.

(10) Patent No.: US 9,334,128 B2
(45) Date of Patent: May 10, 2016

(54) ASSEMBLY OF VENTURI-EFFECT VACUUM GENERATOR MODULES, AND MODULE FOR SAID ASSEMBLY

(75) Inventors: Pierre Milhau, Bourg de Peage (FR); Michel Cecchin, Montelier (FR)

(73) Assignee: COVAL, Montelier (FR)

(*) Notice: Subject to any disclaimer, the term of this patent is extended or adjusted under 35 U.S.C. 154(b) by 191 days.

(21) Appl. No.: 13/984,812

(22) PCT Filed: Feb. 29, 2012

(86) PCT No.: PCT/EP2012/053411
§ 371 (c)(1),
(2), (4) Date: Aug. 9, 2013

(87) PCT Pub. No.: WO2012/117011
PCT Pub. Date: Sep. 7, 2012

(65) Prior Publication Data
US 2013/0315761 A1    Nov. 28, 2013

(30) Foreign Application Priority Data
Mar. 3, 2011    (FR) .................................. 11 51741

(51) Int. Cl.
*F04F 5/20*    (2006.01)
*F04F 5/52*    (2006.01)
(Continued)

(52) U.S. Cl.
CPC .............. *B65G 47/917* (2013.01); *B65G 47/91* (2013.01); *B66C 1/0268* (2013.01); *F04F 5/20* (2013.01);
(Continued)

(58) Field of Classification Search
CPC ................. F04F 5/16; F04F 5/20; F04F 5/48; F04F 5/52; F15B 13/0817; F15B 13/085; F15B 13/0857; F15B 13/0867; F15B 13/0875; Y10T 137/87885
USPC .......................................... 417/187; 294/64.2
See application file for complete search history.

(56) References Cited

U.S. PATENT DOCUMENTS 5,244,242 A    9/1993    Goedecke et al.
5,601,415 A *  2/1997    Nagai et al. .................... 417/187
(Continued)

FOREIGN PATENT DOCUMENTS

EP    1 775 243 A2    4/2007
FR    1 521 022 A      4/1968

OTHER PUBLICATIONS

"Industrielle Kommunikation Fuer Die Automatisierung," Siemens, retrieved from the Internet: URL:http://1hc-div.web.cern.ch/IndCtrl/GUA/PI/CD-SimaticNet/doc/docbrowser/, Apr. 2001, 15 pages.

*Primary Examiner* — Peter J Bertheaud
(74) *Attorney, Agent, or Firm* — Muncy, Geissler, Olds & Lowe, P.C.

(57) ABSTRACT

A vacuum generator module having a substantially rectangular box housing electronic controls for controlling and monitoring the operation of pneumatic vacuum generators and their electrical connections with an electrical power supply and external control members, including an input connector and an output connector installed in one of the faces of the box. The first module is a master module that includes a microcontroller adapted to the communications protocol first of a fieldbus present in a vacuum handling machine incorporating the first module, and secondly of a bus that is dedicated to the other modules. Each of the other modules is a slave module including a microcontroller adapted to the communications protocol of the dedicated bus.

4 Claims, 1 Drawing Sheet

(51) Int. Cl.
  *F15B 13/08* (2006.01)
  *B65G 47/91* (2006.01)
  *B66C 1/02* (2006.01)
  *H04L 12/413* (2006.01)

(52) U.S. Cl.
  CPC ............... *F04F 5/52* (2013.01); *H04L 12/413* (2013.01); *F15B 13/0817* (2013.01); *F15B 13/0857* (2013.01); *Y10T 137/87885* (2015.04)

(56) References Cited

U.S. PATENT DOCUMENTS

| | | | |
|---|---|---|---|
| 5,887,623 A * | 3/1999 | Nagai et al. | 137/884 |
| 6,147,967 A | 11/2000 | Ying et al. | |
| 2001/0045755 A1 | 11/2001 | Schick et al. | |
| 2006/0288142 A1 | 12/2006 | Beyer et al. | |

* cited by examiner

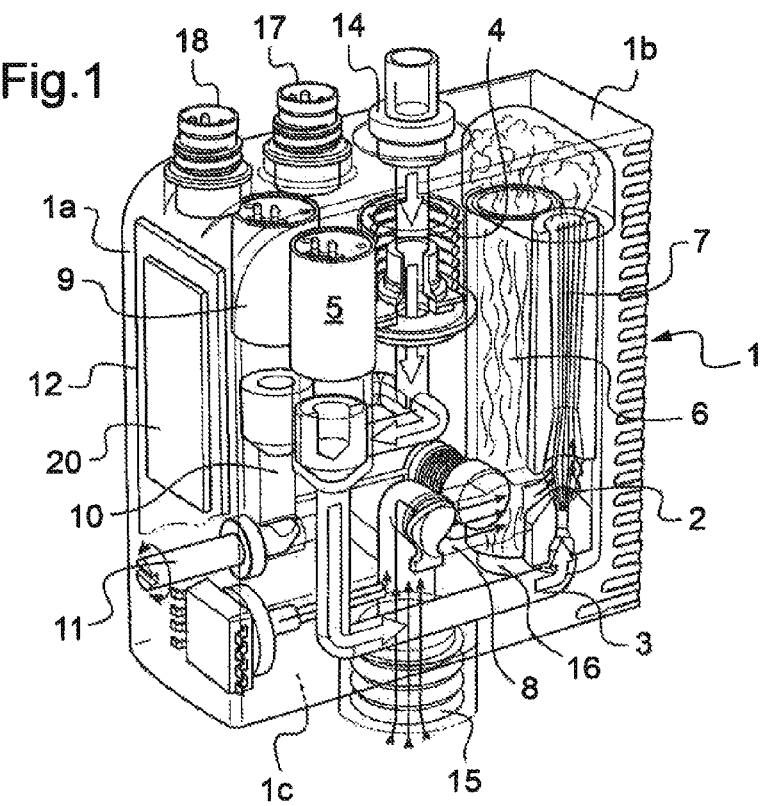
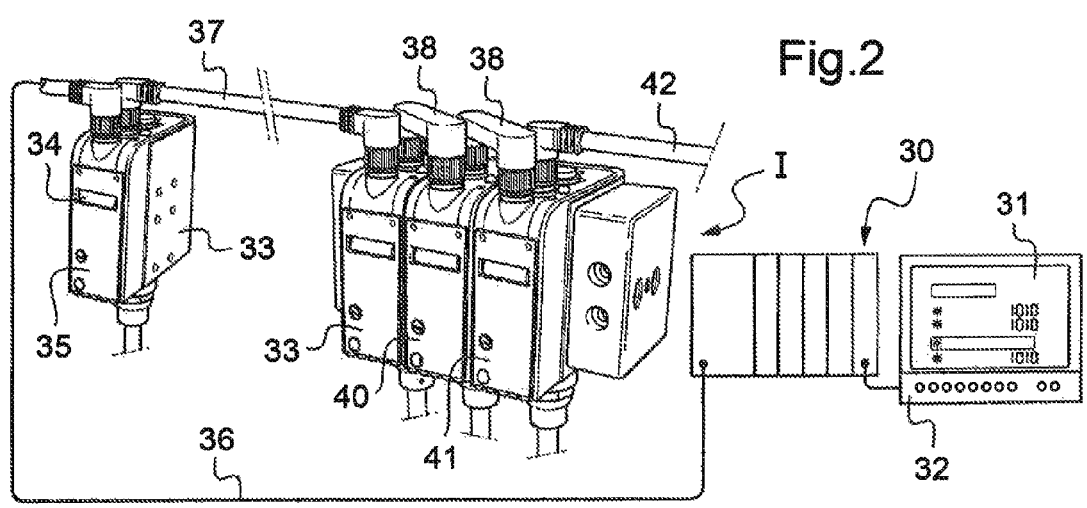

ASSEMBLY OF VENTURI-EFFECT VACUUM GENERATOR MODULES, AND MODULE FOR SAID ASSEMBLY

The present invention relates to vacuum gripper devices, and more precisely to vacuum generator devices arranged in the immediate proximity of gripper members proper as constituted by suction cups or suction boxes.

BACKGROUND OF THE INVENTION

Vacuum gripper systems make use of the Venturi effect for generating the suction needed for gripping and handling articles by means of suction cups that receive the generated vacuum. Such vacuum generators or vacuum pumps, sometimes referred to as "ejectors", are in the form of boxes or modules that are fed with a gas under pressure that, on passing through an internal flow throat, creates suction in a chamber at the throat, and thus creates the necessary vacuum. Each module thus has an inlet orifice for gas under pressure, a suction orifice for connecting to a gripper member, and an outlet orifice for the expanded gas plus the gas that has been sucked in.

Such boxes or modules are also fitted with control means (solenoid valves), monitoring means (pressure gauges), or regulation means, incorporated in each module and serving firstly to execute commands delivered to each module over a fieldbus associated with the machine in order to perform a gripping cycle delivered by a programmable automaton and secondly to optimize the operation of each pump depending on the vacuum needs encountered and on how they vary while the gripper is in operation. This management of the operation of each pump makes it possible to adjust energy consumption to match requirements as closely as possible, where energy consumption in this situation is the consumption of gas under pressure.

These vacuum pumps are adjusted at the location of each pump, which. possesses a front face for communication with man/machine dialog elements such as pushbuttons in order to set setpoint values and to display elements for viewing useful parameters during operation.

In a gripper of that type, locating the vacuum generator in the vicinity of the or each suction cup is necessary or desirable in order to optimize the operation of the equipment in terms of energy savings and response times, for example. It is then difficult or even. dangerous to access each of these generators during the operation of vacuum gripper and handling machines in order to specify the level of vacuum required for each application of the machine (e.g. as a function of the porosity of the material that is to be held and moved) or in order to remedy a defect observed in the operating cycle of such-and-such a suction cup of the gripper.

OBJECT OF THE INVENTION

There thus exists a need for the programmable automaton to centralize the knowledge, the monitoring, the adjustment, and the modification of the parameters of the insulation, such as for example the level of vacuum that is to exist in each gripper in operation.

The object of the invention is thus to provide a set of at least two Venturi effect vacuum generator modules for a vacuum gripper and handling appliance that has a first module with communications means for communicating with a control unit of the appliance, and at least one second module that has mutations means for communicating with said first module.

More precisely, each vacuum generator module comprises a substantially rectangular box housing:
- the pneumatic vacuum generator means and their channels for connection to an admission orifice for admitting a gas under pressure, to a gas exhaust orifice, and to a. suction orifice, each orifice opening to the outside via one of the faces of the box; and
- electronic means for controlling and monitoring the operation of the pneumatic means and their electrical connections with an electrical power supply and external control members using a defined program, including two connectors, one being an input connector, and the other being an output connector likewise installed in one of the faces of the box;
- the first module being a master module that includes a microcontroller adapted to the communications protocol firstly of a fieldbus present in a vacuum handling machine incorporating the first module, and secondly of a bus that is dedicated to the other modules; and
- each of the other modules being a slave module including a microcontroller adapted to the communications protocol of the dedicated bus.

The electronic means integrated in prior art vacuum generator modules make it possible to receive commands from the central control unit that is generally programmed to cause the generator of the module to perform an operating sequence. in a master module, the electronic means also serve to relay commands to slave modules over the dedicated bus.

In all of the modules, the electronic means also send module status signals over the dedicated bus to the master module from a state module, or over the fieldbus to the control unit for a master module, which status signals relate for example to the level of vacuum that has been achieved (as determined by an electronic suction detector), with the unit taking this into account in order to continue or to interrupt the operating sequence, depending on whether or not the emitted signal is a fault signal.

The electronic means are also capable of activating communication means (e.g. indicator lights) housed on a face of a generator in order to indicate visually to an operator whether a module is in a normal state or in a faulty state.

The microcontroller incorporated in the electronics of each generator module of the invention makes it possible for the operations of adjusting and monitoring each generator to be formed remotely from the control unit, via each master module.

With generators that are said to be in islands, being mounted side-by-side in sets, a master generator is connected to the machine fieldbus, while the other generators of the island (slaves) are in communication with the master generator via a local bus that has its own communications mode, which remains the same regardless of the protocol of the fieldbus. The microcontroller managing the inputs and outputs of the master module is capable of transmitting data to the central control unit using the communications protocol it imposes.

According to a particular characteristic of the invention, in order to give the manufacturer of the machine complete freedom in terms of selecting a central unit, two types of master module are proposed, one with a microcontroller suitable for communicating with the central unit by means of a protocol of the industrial Ethernet type, and the other with a microcontroller that is adapted to communicate with other protocols such as "ProfiBus", "ModBus", "CanOpen", "DeviceNet", etc . . . , the vacuum generator slave modules being completely unaffected by the communications protocol of the selected unit.

According to the invention, the master module is a special module that comes in only two types.

Thus, the invention makes it possible to centralize the initial setting of each module by acting from the central unit and to control operation. This ability to set each module from the central control unit is advantageous since it makes it easy to achieve greater versatility in the machine concerning the various materials it may be required to handle, and to do so from a zone of the machine that lies outside the potentially dangerous zone surrounding the robot arm that usually constitutes the machine.

In a preferred embodiment of the invention, the electrical connectors are present side-by-side on a top face of the module, such that the local bus that interconnects each of the modules of an island is formed by a plurality of rigid connection caps covering the electrical conductors and provided with parallel M8 connectors suitable for being plugged both on the input connector of a module and on the output connector of the adjacent module.

Other characteristics and advantages invention appear from the description given below of an embodiment of the invention.

BRIEF DESCRIPTION OF THE DRAWING

Reference is made to the accompanying drawing, in which:

FIG. 1 is a diagrammatic view of a vacuum generator module in accordance with the invention; and FIG. 2 shows a portion of the vacuum gripping and handling machine making use of modules of the invention.

DETAILED DESCRIPTION OF THE INVENTION

FIG. 1 shows a vacuum generator module in accordance with the invention. It is in the form of a body or housing 1 containing pneumatic components for generating suction by the Venturi effect and electronic components for controlling the pneumatic components in an operating sequence, which sequence is generally programmable and delivered by a central control unit (not shown) forming part of the handling machine in which the module is incorporated.

In known manner, each pneumatic component comprises: a Venturi 2; a channel 3 for feeding the Venturi with gas under pressure coming from a pressure regulator 4 via a vacuum control solenoid valve 5; and an exhaust channel 6, including an exhaust noise damper, for exhausting the pressurized gas coming from the mixer 7 of the Venturi. A suction channel 8 is taken from the Venturi, at its throat.

As shown in the figure, the module also has a branch connection in parallel with the pressure channel 3, the branch connection having a blow solenoid valve 9 with its outlet 10 connected to the suction channel 8. An adjustable flow rate constriction 11 is placed. in this outlet channel to enable the blow flow rate to be adjusted manually from the front face 1a of the box 1.

The electronic components are carried by a card 12 incorporated in the box, which card is electrically connected to the two solenoid valves 5 a 9 and carries a vacuum gauge 13 that delivers a signal representative of the degree of vacuum that exists in the channel 8.

The pneumatic components of the module communicate with the outside environment: via an orifice 14 in its connection to a source of gas under pressure, which orifice is provided in a top face 1b of the box 1; via a suction orifice 15 for its connection to a vacuum gripper such as a suction cup (not shown), which orifice is provided in a bottom face 1c of the box 1 opposite from its face 1b; and via an exhaust orifice 16 of the exhaust channel 6, likewise provided in the face 1c of the box.

The electronic components carried by the card 13 communicate with the outside control environment via output and input connectors 17 and 18. Depending on whether the module is a master or a slave, the electronic components carried by the card 12 differ, or at least incorporate functions that are different in terms of communication and protocol with other equipment in the installation (fieldbus or dedicated bus). In addition, whereas for slave modules, the input and output connectors 18 and 17 may be of the same kind (e.g. of the M8 type), for master modules, these connectors. may either be different if the fieldbus is of the Ethernet type (the output being of the M8 type, while the input is of the RJ type, for example), or else identical if the fieldbus communicates with some other protocol (ModBus, CanOpen, DeviceNet, Profi-Bus, etc . . . ).

In the invention, each electronic card has a microprocessor 20 of a type known from among those available on the market, differing depending on their compatibilities with input and output communications protocols.

With an isolated module, the module must be a master module with a microcontroller adapted to the communications protocol of the fieldbus. If a plurality of modules are isolated, one of them should be selected from among the various master modules and the others should communicate with the central unit only via the master module.

With modules in islands, the local bus is made by the connection means between the successive modules of the island, the module that is connected to the fieldbus being a master module for relaying and translating requests and responses from the other modules of the island, which other modules operate as slaves.

FIG. 2 shows an example of how Communication is organized between modules of the invention and a central control unit 30 with a display 31 and members 32 for man/machine dialog.

The module 33 is an isolated module that possesses an indicator lamp 34 on its front face for enabling its status to be monitored from a distance, e.g. in the form of colors that are different, corresponding respectively to a normal stage of operation, to a minor operating fault, or to a major operating fault, and it also possesses a member 35 for adjusting the blow flow rate.

This module communicates directly with the fieldbus 36 and is the master module for an island I of modules that are connected thereto by a local bus made up of a conductor 37 and rigid electrical connection caps 38 between the inputs and the outputs of the modules 39, 40, and 41, which together form the island I. These identical caps are advantageously in the form of bodies made of plastics material molded onto electrical conductors and parallel end connectors 38a, e.g. of the M8 type. The local bus also serves to provide electrical power for the electronic components in each module by means of a power supply conductor 42.

The invention claimed is:

1. A set of at least two vacuum generator modules, each module comprising a body housing:

pneumatic vacuum generator means and their channels for connection to an admission orifice for admitting a gas under pressure, to a gas exhaust orifice, and to a suction orifice, each orifice opening to the outside via portions of the surface of the body; and electronic means for controlling and monitoring the operation of the pneumatic means and their electrical connections with an electrical power supply and external control members using a defined program, including two connectors, one being an input connector, and the other being an output connector likewise installed at the surface of the body;

wherein:

a first module is a master module that includes a microcontroller adapted to the communications protocol firstly of a fieldbus present in a vacuum handling machine incorporating the first module, and secondly of a bus that is dedicated to the other modules; and each of the other modules is a slave module including a microcontroller adapted to the communications protocol of the dedicated bus.

2. The vacuum generator module implemented in the sets of modules according to claim 1, each module having a body in the form of a substantially rectangular box housing:

said pneumatic vacuum generator means, and said exhaust and suction orifices opening to the outside via one of the faces of the box; and said electronic means for controlling said input and output connectors also being implanted in one of the faces of the box.

3. The module according to claim 2, characterized in that the input connector and the output connector are present side-by-side on a top face of the box of the module, such that the local bus that interconnects each of the modules of an island is formed by a plurality of rigid connection caps covering electrical conductors and provided with parallel M8 connectors suitable for being plugged both on the input connector of a module and on the output connector of the adjacent module.

4. The module according to claim 3, wherein the admission orifice is on the top face of the box and the gas exhaust orifice and the suction orifice are on a face of the box opposite the top face.

* * * * *